United States Patent Office 3,533,991
Patented Oct. 13, 1970

3,533,991
STABILIZATION OF POLYMERIC MATERIAL AGAINST ULTRA-VIOLET RADIATION DEGRADATION
Kshatra Pati Singh, Montreal, Quebec, Canada, assignor to Union Carbide Canada Limited, Toronto, Ontario, Canada, a company of Canada
No Drawing. Continuation-in-part of application Ser. No. 711,863, Mar. 11, 1968. This application Oct. 13, 1969, Ser. No. 866,021
Int. Cl. C08f 45/58, 45/60
U.S. Cl. 260—45.8            4 Claims

ABSTRACT OF THE DISCLOSURE

Certain novel polyolefin compositions are prepared which have improved resistance to degradation due to ultra-violet radiation. The compositions consist of a polyolefin such as polyethylene having incorporated therein certain benzoyl pyridine derivatives together with an antioxidant such as di-t-butyl p-cresol.

---

This application is a continuation-in-part of application Ser. No. 711,863, filed Mar. 11, 1968, and now abandoned.

This invention relates to the stabilization of lower polyolefins against ultra violet degradation. More particularly it relates to lower polyolefins which are stabilized against ultra violet degradation by having incorporated therein a stabilizing amount of certain benzoyl pyridine derivatives and an antioxidant.

The problem of degradation of certain lower olefins such as polyethylene when exposed to ultraviolet radiation is well known. This problem is most acute in high density grades of polyolefin. For example, for reasons of economy, blow moulded polyethylene bottles must be capable of withstanding the impact which results during normal use over prolonged periods. Polyethylene bottles frequently become embrittled and discoloured on prolonged exposure to ultra violet radiation from sunlight. This shortens the life span of such bottles and, particularly in the case of milk bottles, the discolouring effect is detrimental to customer appeal.

In the increased use of moulded polyethylene for structural purposes the problem of ultra-violet degradation is even more acute. In such uses as beverage containers, stadium seats and patio furniture the polyethylene must be capable of being exposed to ultra-violet radiation over a period of years. It is therefore extremely important that steps be taken to stabilize such structures from degradation over a relatively long life span.

It is therefore an object of the present invention to provide a polyolefin composition having improved stability against ultra violet degradation.

It is another object of the present invention to provide a method of stabilizing certain polyolefins by incorporation into said polyolefin a stabilizing amount of certain benzoyl pyridine derivatives together with an antioxidant.

It has been found that effective stabilization of lower polyolefins agains degradation due to exposure to ultra violet radiation can be obtained by incorporating certain benzoyl pyridine derivatives into the polyolefin together with certain antioxidants. The stabilizers which are useful in the present invention are those benzoyl pyridine derivatives which show a maximum in their ultra violet adsorption spectra within the range of from 300 to 360 mμ.

The present invention therefore provides a composition having improved resistance to degradation on exposure to ultra violet radiation which comprises a polyolefin of from 2 to 4 carbon atoms and having incorporated therein a stabilizing amount of a benzoyl pyridine derivative of the formula:

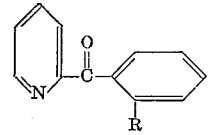

in which R is a radical selected from the group consisting of hydrogen, hydroxyl and an alkoxy group having from 1 to 4 carbon atoms.

The polyolefins which may be stabilized by the pyridine derivatives disclosed in this application are polymerized olefins of from 2 to 4 carbon atoms such as polyethylene and polypropylene. In view of the susceptibility of high density polyethylene to ultra violet degradation the stabilizers of the present application are particularly suited in polyethylene having a density of from 0.941 gram/cc. to 0.965 gram/cc.

Although suitable stabilized polyolefin compositions can be obtained by adding a stabilizing amount of a benzoyl pyridine of the formula mentioned above, preferred stabilizers are selected from compounds of the following formula:

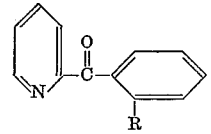

in which R is radical selected from the group consisting of hydrogen, hydroxyl and methoxy.

The benzoyl pyridine derivatives which are particularly suitable as ultra violet stabilizers in polyethylene of a density of from 0.941 to 0.964 gram/cc. is one selected from the group consisting of 2-benzoyl pyridine and 2-(2'-hydroxy) benzoyl pyridine.

Certain antioxidants are also required to be used in conjunction with the benzoyl pyridine derivatives to give the desired stabilizing effect to lower olefins against degradation due to ultra violet radiation. The antioxidants found particularly suitable for this purpose are di-t-butyl p-cresol, di-lauryl thio-dipropionate and 4,4'-thiobis (6-t-butyl 3-methyl) phenol. In order to be effective a concentration of one of such antioxidants in a range of from 0.05% to 0.2% by weight of total composition.

EXAMPLE 1

30 gm. of alpha-picolinic acid is treated with 100 ml. of thionyl chloride over 10–20 minutes period and the mixture heated on steam bath for 30 minutes; then the excess of thionyl chloride is distilled off. After most of the thionyl chloride has been distilled, 100 ml. of anhydrous benzene is added and the benzene is distilled at reduced pressure. An additional 100 ml. of anhydrous benzene is added and 60 gm. of anhydrous aluminum chloride is added over a period of 30 minutes which maintaining a low temperature with an ice-salt bath. The mixture is then heated under reflux for 2–3 hours.

The dark mixture so obtained is poured over 100 gm. of ice and 50 ml. of concentrated hydrochloric acid. The organic layer is separated and discarded. The acid solution is extracted with three 50 ml. portions of ether, which are discarded; then it is treated with 50% aqueous sodium hydrozide until the aluminum hydroxide which first forms redissolves. After cooling, the organic material is extracted with three 50 ml. portions of chloroform. The combined chloroform extracts are washed with water, dried and distilled under vacuum. The yield of 2-benzoyl pyridine, B.P. 135–145°/5 mm., is 29 gm. (85–90%).

The structure of the compound was confirmed by elemental and infra-red analysis.

The effectiveness of the product as a stabilizer against degradation by ultra violet radiation of a high density grade of polyethylene (density: 0.957 and melt index: 0.35) was determined by incorporating the product into the polyethylene on a two-roll mill and forming test pieces by compression molding, the test pieces having the following dimensions: 3" x 1" x 0.04". Except for the first test the test pieces also contained an antioxidant.

The test pieces were exposed to the light from a 15 watt ultra violet lamp for varying periods of time and the resulting discoloration and degree of embrittlement were noted after 18 and 65 hours. The discoloration was determined visually and given a numerical rating in the range of 0 to 6, where "0" indicated no discoloration and "6" indicates extensive discoloration.

The degree of embrittlement was rated by the ease of cracking on repeated flexing of the specimen. As in the case of discoloration, the degree of embrittlement was rated numerically from 0 to 6 with "0" indicating no embrittlement and "6" indicating extensive embrittlement.

The first test piece contained 2-benzoyl pyridine in an amount of approximately 0.05 percent by weight based on the weight of polyethylene. No antioxidant was used in this test sample. The amount of discoloration was not significant and did not increase much after 65 hours. The degree of embrittlement however was given a rating of 5 after 65 hours.

EXAMPLE 2

A test piece was prepared as described in Example 1 containing no benzoyl pyridine but containing 0.1 percent by weight of di-t-butyl p-cresol and 0.1 percent by weight of di-lauryl thio-dipropionate. While the amount of discoloration after 18 hours was not noticeable and was only slight after 65 hours, the test piece exhibited considerable embrittlement after 65 hours.

EXAMPLE 3

A test piece was prepared containing no benzoyl pyridine but approximately 0.2 percent by weight of 4,4'-thiobis (6-t-butyl 3 methyl) phenol based on the weight of polyethylene. Again very little discoloration was exhibited but the piece was very brittle after 65 hours.

EXAMPLE 4

In this test the polyethylene piece contained 0.05 percent by weight of 2-benzoyl pyridine, 0.05 percent by weight of di-t-butyl cresol and 0.05 percent by weight of di-lauryl thio-dipropionate based on the weight of the polyethylene. While an amount of discoloration appeared after 18 hours this did not increase after 65 hours and the test piece showed very slight embrittlement.

EXAMPLE 5

A test piece was prepared containing 0.05 percent by weight of 2-benzoyl pyridine and 0.1 percent by weight of 4,4'-thiobis (6-t-butyl 3-methyl) phenol based on the weight of polyethylene. Again the amount of embrittlement after 65 hours of ultra-violet exposure was slight and the amount of discoloration was within acceptable limits for most commercial uses.

EXAMPLE 6

A test piece was prepared containing 0.15 percent by weight of 2-benzoyl pyridine, 0.1 percent by weight of di-t-butyl p-cresol and 0.1 percent by weight of di-lauryl thio-dipropionate. After 65 hours of ultra violet exposure it exhibited very little embrittlement and less discoloration than the test piece of Example 5.

EXAMPLE 7

A test piece was prepared containing 0.15 percent by weight of 2-benzoyl pyridine and 0.05 percent by weight of 4,4'-thiobis (6-t-butyl 3-methyl) phenol. The test piece showed very little embrittlement after 65 hours of ultra violet exposure. While discoloration was apparent it was within usually acceptable commercial limits.

EXAMPLE 8

A test piece was prepared containing 0.25 percent by weight of 4-t-butyl phenyl salicylate instead of 2-benzoyl pyridine, 0.1 percent by weight of d-t-butyl p-cresol and 0.1 percent by weight of di-lauryl thio-dipropionate. Considerable discoloration was exhibited after 18 hours of ultra violet exposure which increased to severe discoloration after 65 hours. The test piece also exhibited considerable embrittlement.

The results of the above test are tabulated in the following table:

TABLE I

| | | | Exposure | | |
| | | | 18 hours | | 65 hours | |
| | Stabilizer in percent by weight | Antioxidant in percent by weight | Discoloration | Embrittlement | Discoloration | Embrittlement |
|---|---|---|---|---|---|---|
| Test No.: | | | | | | |
| 1 | 2 benzoyl pyridine, 0.05 | None | 0 | 1 | 1 | 5 |
| 2 | None | DBPC, 0.1 / DLTDP, 0.1 | 0 | 1 | 1 | 5 |
| 3 | do | TBMP, 0.2 | 0 | 1 | 1 | 5 |
| 4 | 2 benzoyl pyridine, 0.05 | DBPC, 0.05 / DLTDP, 0.05 | 3 | 0 | 3 | 2 |
| 5 | do | TBMP, 0.1 | 3 | 1 | 4 | 2 |
| 6 | 2 benzoyl pyridine, 0.15 | DBPC, 0.1 / DLTDP, 0.1 | 3 | 1 | 3 | 2 |
| 7 | do | TBMP, 0.05 | 4 | 2 | 4 | 2 |
| 8 | TBS, 0.25 | DBPC, 0.1 / DLTDP, 0.1 | 5 | 0 | 6 | 5 |

NOTE:
TBS is 4-t-butyl phenyl salicylate.
DBPC is di-t-butyl p-cresol.
DLTDP is di-lauryl thio-dipropionate.
TBMP is 4,4'-thiobis (6-t-butyl 3-methyl) phenol.

From the results of Tests Nos. 1 to 7, it may be seen that although after 18 hours exposure there was no significant difference between the embrittlement of stabilized and unstabilized sample, the test pieces containing only 2-benzoyl pyridine or anti-oxidants showed significant embrittlement after 65 hours exposure whereas, for the test piece containing both 2-benzoyl pyridine and antioxidant there was less embrittlement after 65 hours.

The results of Test No. 8 are included in Table I to to illustrate how much more effective is the 2-benzoyl pyridine in retarding degradation due to ultra violet radiation than is another well known ultra violet stabilizer.

I claim:
1. A composition having improved resistance to degradation on exposure to ultra violet radiation which comprises a polymer of an olefin having from 2 to 4 carbon atoms and having incorporated therein a stabilizing amount of 2-benzoyl pyridine together with an effective amount of an antioxidant selected from the group consisting of di-t-butyl p-cresol, di-lauryl thio-dipropionate and 4,4'-thiobis (6-t-butyl 3-methyl) phenol.

2. A composition as claimed in claim 1 wherein from 0.01 percent by weight to 5 percent by weight of 2-benzoyl pyridine is incorporated into the polymer.

3. A composition as claimed in claim 2 wherein the polymer is polyethylene having a density of from 0.941 to 0.964 grams/cc.

4. A composition as claimed in claim 3 wherein from 0.05 percent by weight to 1 percent by weight of 2-benzoyl pyridine is incorporated into the polyethylene.

References Cited

UNITED STATES PATENTS

| | | | |
|---|---|---|---|
| 3,117,129 | 1/1964 | Boyle | 260—297 |
| 3,123,647 | 3/1964 | Duennenberger et al. | 260—591 |
| 3,389,004 | 6/1968 | Dressler et al. | 106—176 |
| 3,467,670 | 9/1969 | Suh | 260—45.8 |

DONALD E. CZAJR, Primary Examiner

R. A. WHITE, Assistant Examiner

U.S. Cl. X.R.

260—45.85, 45.95